United States Patent
Thieret et al.

(10) Patent No.: US 7,301,650 B2
(45) Date of Patent: Nov. 27, 2007

(54) INTELLIGENT SYSTEM NETWORK INTERFACE ARCHITECTURE FOR DOCUMENT PROCESSING DEVICES

(75) Inventors: Tracy E. Thieret, Webster, NY (US); Stephen P. Hoover, Penfield, NY (US); William J. Hannaway, Webster, NY (US); Naveen Sharma, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 1475 days.

(21) Appl. No.: 09/731,205

(22) Filed: Dec. 6, 2000

(65) Prior Publication Data

US 2002/0067497 A1 Jun. 6, 2002

(51) Int. Cl.
*G06F 15/00* (2006.01)
*G06K 1/00* (2006.01)
(52) U.S. Cl. ............... 358/1.13; 358/1.13; 358/1.15
(58) Field of Classification Search ............. 358/1.1, 358/1.9, 1.11–1.18
See application file for complete search history.

(56) References Cited

U.S. PATENT DOCUMENTS

| | | | | |
|---|---|---|---|---|
| 5,270,775 A | * | 12/1993 | Suzuki | 399/8 |
| 5,636,333 A | | 6/1997 | Davidson et al. | |
| 5,898,823 A | * | 4/1999 | Sorkin et al. | 358/1.15 |
| 6,219,151 B1 | * | 4/2001 | Manglapus et al. | 358/1.15 |
| 6,452,692 B1 | * | 9/2002 | Yacoub | 358/1.15 |
| 6,606,164 B1 | * | 8/2003 | Irie et al. | 358/1.15 |
| 6,671,066 B1 | * | 12/2003 | Aikawa et al. | 358/1.18 |
| 2002/0054319 A1 | | 5/2002 | Maekawa et al. | |
| 2003/0140315 A1 | * | 7/2003 | Blumberg et al. | 715/527 |

FOREIGN PATENT DOCUMENTS

| | | |
|---|---|---|
| DE | 697 31 696 | 12/2004 |
| EP | 0 825 551 A | 2/1998 |
| JP | 10063443 | 3/1998 |

OTHER PUBLICATIONS

European Search Report, Oct. 31, 2005, 2 pages, Application No. EP 01 12 8911, European Patent Office.

* cited by examiner

*Primary Examiner*—Gabriel Garcia
*Assistant Examiner*—Thierry L. Pham
(74) *Attorney, Agent, or Firm*—Fay Sharpe LLP

(57) ABSTRACT

A method and apparatus is provided for operating a network based assembly for document processing when the assembly includes an intelligent Network Interface Controller (iNIC), a Document Processing Device (DPS) and a Digital Front End (DFE) for the DPS. Job data and control data communicated to the assembly through the network are communicated solely through the iNIC functioning as a threshold to the DPS assembly. The iNIC segregates any such data to identify job data that needs to be communicated to the DFE from other data that can be directly communicated to the DPS. Enhanced communication efficiency results from directly communicating control data to the DPS to avoid bottleneck communication of all data through the DFE.

2 Claims, 3 Drawing Sheets

INTELLIGENT SYSTEM NETWORK INTERFACE ARCHITECTURE FOR DOCUMENT PROCESSING DEVICES

FIELD OF THE INVENTION

The present invention relates to distributed network architecture and more particularly to a network assembly including a document processing device, remotely operable through the network, by communication of control data and job data specifying a job for the device, such as a print job. More specifically, the present invention relates to an architecture and method for enhancing direct communication of the control data between a marking engine and a network, thereby avoiding communication flow path restrictions through a printer controller normally disposed for translating print job data into recognizable marking engine signals.

BACKGROUND OF THE INVENTION

Image information, as is commonly communicated through a network or Internet system, is ultimately appreciated by an operator through electronic display, or physical printing of the document onto a piece of paper by a marking engine like a printer. The system architectures for transmitting print jobs from one point to a remote location by employing either a local or wide area network are well known. The flow path for the job data and control data that define the print job is usually from the network and then through an interface program block (usually computational hardware) implemented in or attached to the marking engine as part of its normal functions. Such program blocks, commonly referred to as the Digital Front End (DFE) of the marking engine, were developed as computational entities that perform the complex task of converting a document presented as a Page Description Language (PDL) into a form that can be printed by a specific marking engine. Its intended function is limited to the image path alone. Asking a DFE to perform additional functions stretches the design intent of the device and further constrains the bottleneck that exists in decomposing images. The additional functions that are required are those that stabilize the behaviors of the marking system, enable specialized rendering algorithms, and perform the management functions that support the normal operation of the device. Thus, the DFE is primarily and best only concerned with receiving print job data from a network and translating that data into marking engine printing signals such as byte definitions per pixel. Current system architecture disposes the DFE as a solitary network interface for most document processing devices. Thus, any data communication to the marking engine, be it job, control, software or otherwise, needs presently to be directed through the bottleneck of the DFE intermediate the marking engine and the communication network.

This limited system architecture gives rise to a series of data flow problems inherent in trying to achieve bi-directional connectivity through the DFE and the marking engine.

Many combinations of marking engines and DFEs are manufactured by different entities. Accordingly, the data flow through a variety of different DFEs and respectively associated marking engines normally presents practical problems, the resolution of which requires negotiations between DFE manufacturers and marking engine manufacturers in order to try to achieve the desired bi-directional connectivity through the DFE. Due to the number of entities involved, the different operating characteristics of the various marking engines and the various DFEs, such negotiations have been largely unsuccessful. Thus, printer management, diagnostics, image processing, and other control path data flows are essentially held hostage to the system implemented operating features determined by the various DFE manufacturers/vendors.

There is a continually escalating need for enhanced printer communication with the network to communicate job and printer status information to and from users/customers, and for providing advanced marking engine functionality to such customers to facilitate better system operation. The interposition of the DFE between a printer and a network precludes direct inquiry of the printer since communication must be through the DFE. When the DFE is structured to inhibit, or at least limit, the communication of relevant printer information to the printer or back to the network, system operation, as well as practical information concerning job assignments, will usually suffer.

Document Processing devices ("DPS") refers to a set of devices that construct, produce, print, transmit, scan, store and archive documents and their constituent elements. Such devices include marking engines, printers, scanners, fax machines, electronic libraries, and the like. The present invention addresses situations particularly relevant to printing systems and discusses them as a prime example of a Document Processing System, but should not be construed to be limited to any such particular printing application. Any DPS is intended to benefit from the advantages of this invention.

The subject invention is directed to overcoming the problems resulting from typical present architectures wherein a DPS system is assembled so that the DFE is connected between the communication network and the DPS. Although such architecture readily permits the desired flow of image data files over the network to the DFE for rendering and subsequent processing by a DPS, any information that the DPS can provide back to the network, or any non-image data that is available for improved system management, must pass through the DFE. Since such flow path communications may vary between different manufacturers, there is a long felt need for a system that can facilitate marking engine control information to and from the network, without requiring a flow path to a DPS through the DFE.

The present invention overcomes the above recited problems to provide a system architecture which allows direct communication between a network and a DPS, thereby by-passing the DFE controller, and providing substantial value-added services to the benefit of system users.

BRIEF SUMMARY OF THE INVENTION

In accordance with the present invention, there is provided a network document system including a marking engine, a marking engine controller and a network interface controller. The network interface controller is disposed intermediate of the network and the marking engine controller and the marking engine, and for parallel communication with the marking engine controller and the marking engine. The network interface controller segregates marking engine job data and marking engine control data and selectively communicates the control data from the network directly to the marking engine or commonly to both the marking engine and the marking engine controller. The job data is routed through the marking engine controller for conversion into acceptable marking engine data format.

In accordance with a more limited aspect of the present invention, the control data includes any of diagnostic data, operating software, remote operating instructions or performance reports. The performance reports can comprise the number of documents generated by the marking engine, individual job data—including media types and sizes, simplex/duplex, stapled (or not), collated (or not), and the like—accounting information for assigning billing responsibilities for documents generated, usage data, toner, ink or paper consumption data, service history, device configuration, current status, machine identification or part or system failure data.

In accordance with another aspect of the present invention, the interface controller identifies object-oriented rendering data within the job data, and parallelly or separately communicates the object-oriented rendering data to the marking engine controller and the marking engine for facilitating improved efficiency of the rendering of the job data by the marking engine.

In accordance with yet another aspect of the present invention, the subject architecture is preferably implemented as a business-to-business communication system for controlling and monitoring printer operations through Internet communications. The disposition of the network interface controller between the marking engine and the internet system facilitates distinguishing and selectively directing remote communication signals as either job data to the printer DFE, or control data directly to the printer. Communication of DPS operational status reports, like accounting and billing information, can be enhanced and expedited.

In accordance with yet another aspect of the present invention, a method is provided for operating a network-based assembly including document processing devices comprising an interface controller, a document processing device and a DFE for the document processing device. The method includes steps of communicating job data and control data to the assembly through the network system. The job data and control data are received through a threshold interface comprising the interface controller which segregates the control data from the job data. The control data is communicated directly to at least the document processing device, while the job data is only communicated to the DFE. The job data is converted at the DFE to document processing signals recognizable by the document processing device, which can be executed in accordance with the desired job. Communicating of the control data directly between the interface controller and the document processing device excludes a flow path through the DFE that would normally inhibit control communication.

The principal advantage of the subject invention is an explicit bifurcation of the image and control path data streams prior to and around the DFE. Such bifurcation obviates obtaining approval or acquiescence of a DFE vendor to permit "pass-through" of control path information through a DFE proprietary system.

Yet another advantage of the subject invention is a single internet address of a document processing device comprising an intelligent network interface controller, associated by name or otherwise, with the DPS itself, for enhanced DPS identity recognition regardless of the associated DFE. Since the DFE is no longer an exclusive network interface for the DPS, bidirectional connectivity between the DPS and the network is identified by an Internet address associated with the intelligent network interface controller and not the DFE. The interface controller is thus recognized as more of an associated component of the DPS, and usually customers will observe the interface controller as the marking job server, rather than the DFE.

Yet another advantage of the subject invention is a business-to-business communication system which facilitates the communication of accounting, billing, operational upgrades or status reports through internet transmission for more expeditious and reliable communication through the network between a document processing device and a remote business associate.

Further objects and advantages of the present invention will become apparent from the following descriptions of the various embodiments and characteristic features of the present invention.

BRIEF DESCRIPTION OF THE DRAWINGS

The following brief descriptions of the drawings are presented for illustration purposes only and should not be limitative of the scope of the present invention, and wherein.

DETAILED DESCRIPTION OF THE PREFERRED EMBODIMENTS

Figure 1:
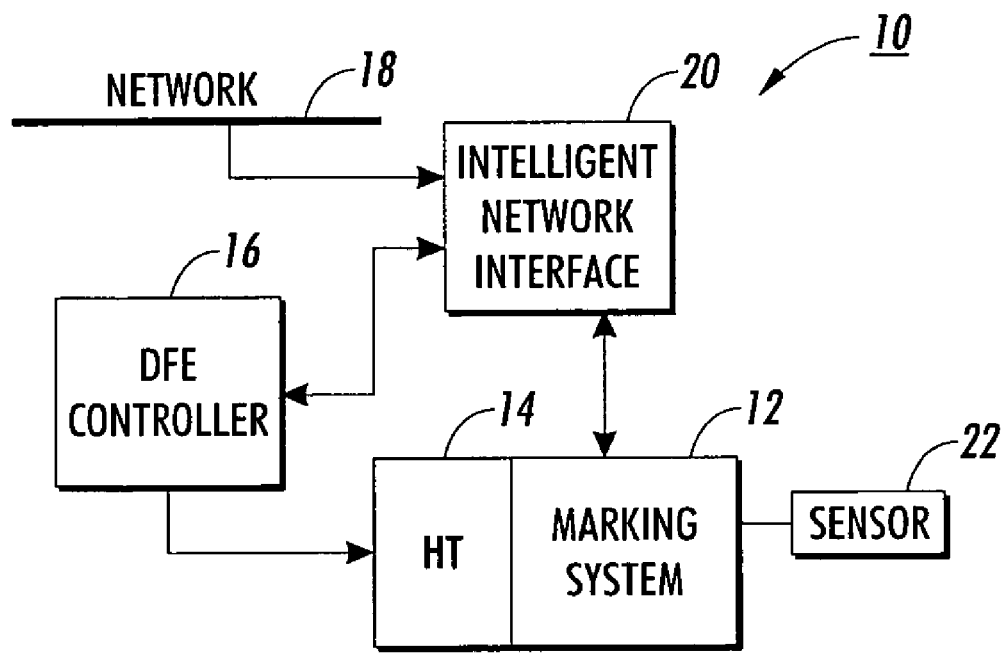
FIG. 1 is a block diagram illustrating an implementation of a network document system architecture in accordance with the present invention.

Referring now to the drawings wherein the showings are for purposes of illustrating the preferred embodiments of the invention only and not for purposes of limiting same, FIG. 1 shows a block diagram illustrating an assembly of a document processing device architecture wherein a marking engine 12 is shown by way of example. As noted above, the document processing device can be a variety of different elements, all capable of providing an image of some form or another to an operator/user. The invention has a common application in a printing or xerographic environment. A typical marking system includes a digital halftoning block 14 and a DFE controller 16, all of which elements are conventional in structure and operation for converting job data and control data signals communicated from a network 18 to the assembly 10 for desired job execution. "Network" includes Internet as well as many other types of networks as well. Wireless, local LAN, or phone networks (including DSL) are also intended to be included in this term. Even power networks (if used for communication) and cable TV distribution networks are included as potential communication paths.

It is a feature of the invention that a physical or logical computational device, i.e., an intelligent network interface controller (iNIC) 20 is placed between the DFE 16 and the network 18. The iNIC 20 is also directly connected to the marking engine 12. The network interface for the system 10 thus is no longer the DFE 16 as in prior art systems, but is now the iNIC 20. Thus, the iNIC 20 receives all the network traffic addressed to the marking system 10 both for normal functions, and also any traffic comprising bidirectional control information necessary to manage and optimize device performance. In other words, a new architectural concept is implemented, placing the responsibility for receipt of all information for and about the DPS into a computational device connected between the network and the DPS. It is within the scope of the invention that the iNIC 20 may be both physically and logically distinct from the DFE 16, or the distinction may be logical and in data flow only, i.e. a software block component of a logical DFE resident within a print engine assembly. It is of course a useful and highly desired feature of the subject invention that the same data flow and logical view can be used whether or not the DFE is an integral component of the print engine. However, instantiating such separate logical and data views on the same hardware, e.g., within a Xerox® controller architecture, is relatively easy and provides cost savings for most cases.

There are many feasible implementations of the iNIC 20, the most desirable will be application specific. As an example, an iNIC card can comprise a simple logical port functionality on a card with some embedded processor functionality and a standard Ethernet network interface functionality. The invention could include having PDL and control data coming from a print driver on one logical port, e.g. for a machine with Ethernet address 13.0.10.103, use 13.0.10.103:8001 for job and PDL data and 13.0.10.103: 8002 for control path remote diagnostic and other data. (Port and IP numbers are for example only.) The printer driver would simply speak to the correct port and any other device management applications would speak on the other. The iNIC would route the data appropriately to the system elements, DFE and marking, using whatever connectivity is appropriate, e.g., a standard Ethernet interface to the DFE for vendors thereof and a coherent standard interface for marker control and diagnostics data such as that being defined by the marking engine vendor. The iNIC could also act as a translator for legacy devices that do not cohere to external system management standards such as SNMP (Simple Network Management Protocol). Other methods possible to distinguish the data are tags, embedded in the data streams. Regardless, with the current computational power already inside many modern DPS and or available at low cost, the splitting and distribution of this information stream by the iNIC to the correct DFE and marker diagnostics and control stream will be relatively easy and cost effective.

Figure 2:
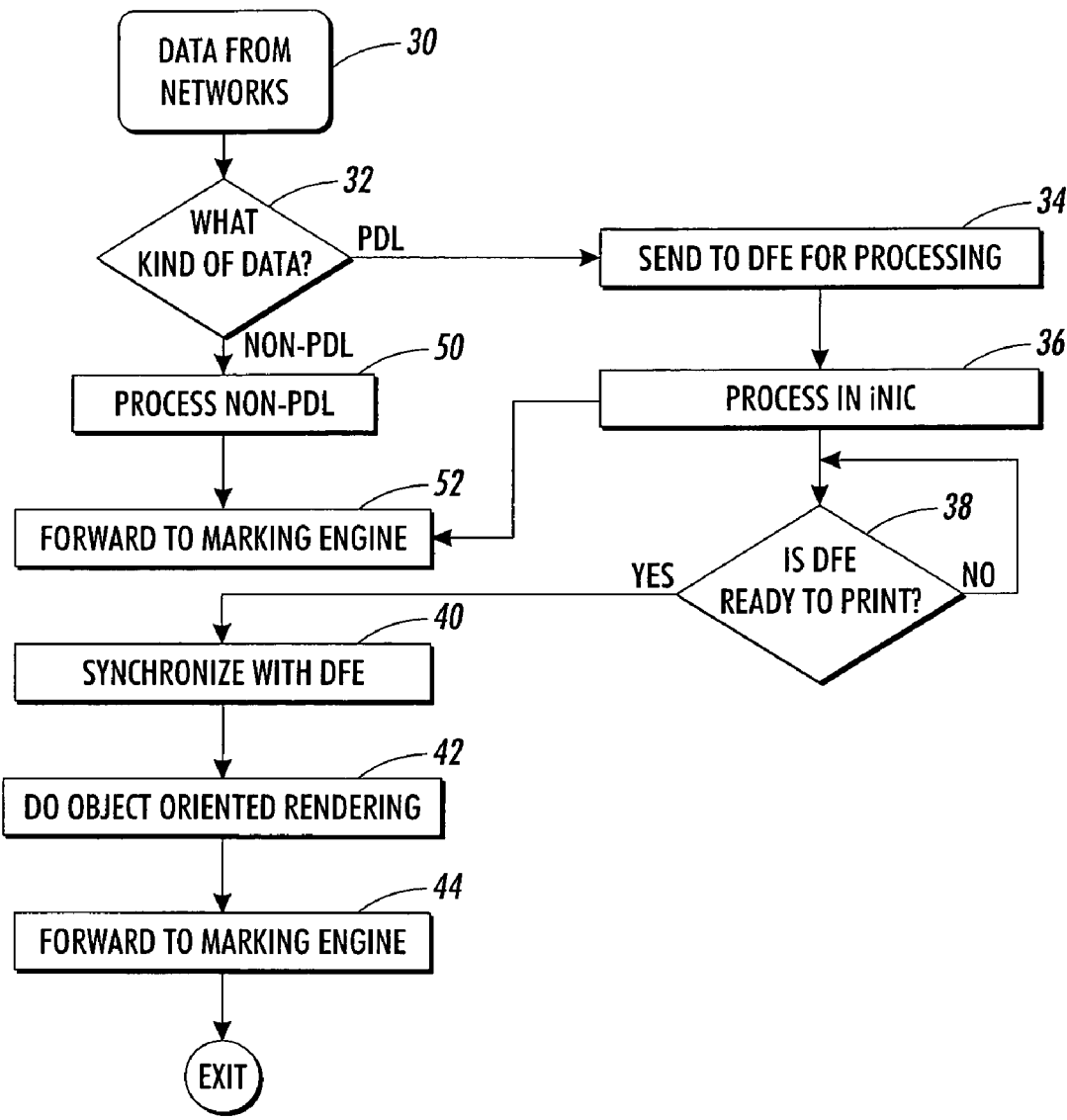
FIG. 2 is a flowchart illustrating a data flow path from a network user to an online Document Processing device.

With particular reference to FIG. 2, a flowchart illustrating the processing steps for implementing the bifurcation of the image and control path data streams relative to what data should be directly communicated to the DFE, and what data can be directly communicated to the marking engine, is shown. A data item 30 is placed on the network 18 and eventually communicated to the iNIC 20 in a conventional and well known addressing scheme. The iNIC 20 makes the determination 32 of what kind of data is being sent to the DPS 10. If the data is job data specifying the imaging operation, conventionally a Page Description Language (PDL) file like Postscript®, then the data must be sent 34 to the DFE for processing into the appropriate signals recognizable by the marking engine for executing the print job. Conventionally, such a signal would be a byte pattern per pixel. In certain circumstances it may be appropriate, such as to facilitate object-oriented rendering, to process 36 the job data in the iNIC also. The DFE processes 38 the job data and when it is ready to print, synchronizes 40 the marking engine with the DFE, does object-oriented rendering 42 if appropriate, and forwards the processed data to the marking engine for execution of the imaging job. Such a data flow path through the DFE is largely conventional except for parallel processing in the iNIC. On the other hand, when the data are determined to be nonPDL data, it is a particular feature of the invention that such nonPDL data are not routed to the DFE but are processed 50 in the iNIC in accordance with any a number of applications to better support the management of the DPS, particularly where such data flow when communicated directly to the marking system either benefits or enhances a DPS system operation. Typically, such nonPDL data will comprise control data relative to DPS operation, as opposed to data defining the particular imaging job at hand. After such control data is properly processed in the iNIC, it is forwarded 52 to the marking engine.

The network data 30 thus can be communicated directly to either the DFE or processed in the iNIC for direct communication to the marking engine. Segregating the data between control data and job data usually occurs by recognition of the identifier distinguishing the job data from the control data. For example, a PDL file is usually prefixed with an identifier indicating that it is a Postscript® file which is read as an indication that it should be sent essentially verbatim to the DFE 16. However, the iNIC 20 may also retain a copy of the file for producing some corresponding object-oriented rendering data which can be communicated to the halftoner 14 while the DFE is processing the job data (i.e. during the raster image processing (RIP)) time. More simply stated, the iNIC can complete the processing and advise the halftoner 14 what kind of byte definition (text, picture, graphics) corresponds to where the pixel definitions will occur on the page and so advise the marking system 12.

Figure 3:
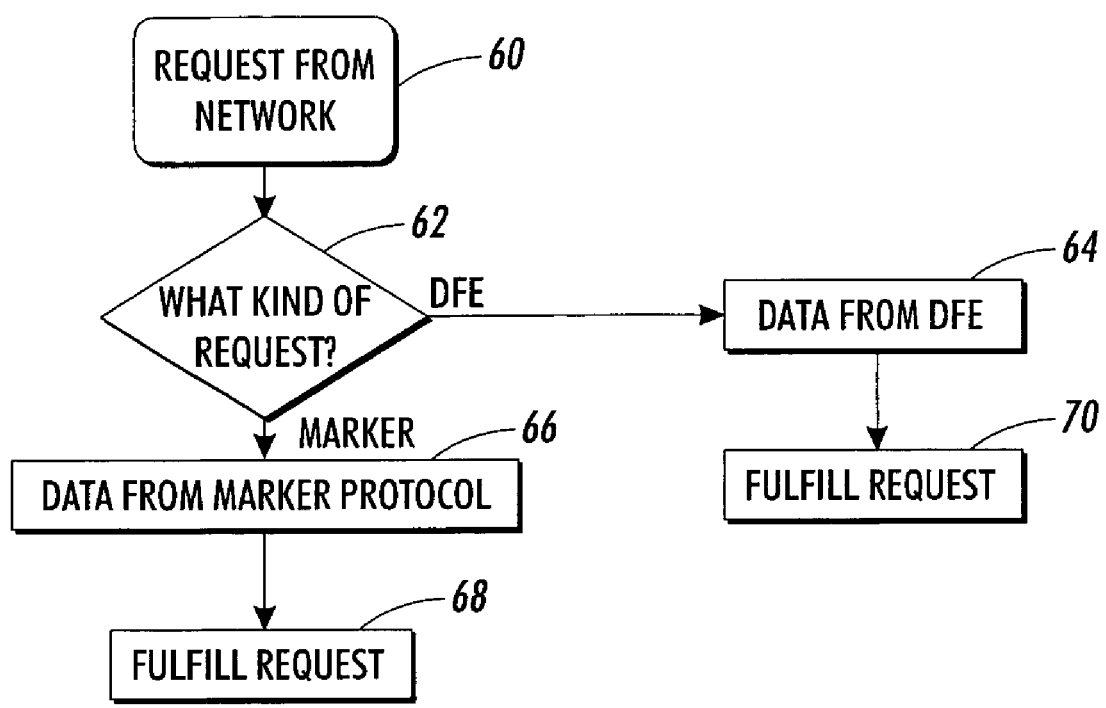
FIG. 3 is a flowchart illustrating the processing steps for a network data request from an online Document Processing device assembled in accordance with the network architecture of the present invention.

FIG. 3 shows the processing steps when data are requested from the DPS 10 for communication back on the network 18. Such a request 60 is placed on the net and again the iNIC 20 will analyze 62 the request to ascertain whether the requested data is data to be derived from the DFE 64 or from the marking engine 66. In a situation where the data are to be derived directly from the marking engine 12, the data can be communicated directly back 70 to the network 18 through the iNIC 20, without communication through the DFE. Where the data are to be derived from the DFE, it must be communicated to the iNIC 20 before being placed back 68 on the net 18. Such data requests will be particularly useful for commercial information such as billing and accounting data, or for operational analysis such as system diagnostics.

VALUE-ADDED SERVICES

There are a number of applications that better support or provide enhanced management of the DPS when the data are communicated directly from the marking system without passing through the DFE. These comprise:

Remote Diagnostics

The prior known solution to the problem of access to the marking system is to use a separate connection (usually a modem) to gain access to the device specific information not available through the DFE or from the native device as in a non-networked copier. This invention permits accesses directly to the marking system hardware 12 separate from the DFE 16. The DFE may also be diagnosed but historically there has been no access to the marking engine except as permitted by the DFE manufacturer. Even SNMP MIBs (Management Information Blocks) are implemented at the DFE and as such the implementation suffers from a paucity of data available from the marker. With iNIC 20 the marking system may now be accessed directly from the network through an interface of the DPS supplier's design. This real-time interface would permit a very detailed level of diagnostics of the DPS because of the unrestricted (perhaps real-time) direct access to it. In addition, self-diagnostic programming could be included as a part of the DPS package so that not only can problem reports be sent back, but also suggested solutions or part requests could too. Consequent reduction in technician service time and frequency will certainly result. Also, the enhanced communication capabilities will facilitate fleet level diagnostics for especially recording failure conditions of a DPS for a more informed service diagnosis and perhaps even clarification of some liability determinations.

Information can be sent from a remote entity to the system that sets an event upon which information of a certain type is gathered by the system and locally processed before returning to the remote entity. For example, one may set an event such that when the same fault code occurs in the device occurs twice in a row within 30 minutes of each other that the machine returns information including that fault code and the 2 most frequently occurring fault codes over the last 48 hours and the last time stamp for a service action.

Image Processing

The prior practice of the image processing community was to attempt to assess the nature of images from their bit-maps. This information is important for Object-Oriented Rendering (OOR). In OOR, different segments of a page may be rendered differently in order to optimize their appearance. Text requires sharp edges and consequent high spatial resolution. Business graphics require smooth halftones and sharp color differences to distinguish elements of charts from one another. Pictorials require lower spatial resolution than text but many more color levels to avoid image artifacts. Color sweeps require smoothness and continuity to avoid contouring. When attempting to determine which sequence of bits constitutes which type of image, the discrimination software may become fooled into mislabeling an image segment and rendering it incorrectly. Usually this error results in a rendering that is worse than if nothing were performed.

Hints and tips relating to the customer's image quality requirements may be included in the Postscript® file but getting them past the DFE processing has proven problematic. DFE vendors have no real incentive to provide their customers with paths to accommodate this feature. The subject invention provides access to the Page Description Language specification for the document prior to the DFE for unambiguous image segmentation and identification. Furthermore iNIC 20 provides a path around the DFE to communicate the hints and tips for customer preferences and also through analysis of the PDL may readily disambiguate the identification of image segment identities for optimal halftoning.

Process Control

Image processing normally assumes that the underlying marking engine is stable in its color reproduction—which is of course not true. Any DPS will drift due to changes in normal operating performance over time and varying ambient conditions. The necessary stability is achieved through regular calibration. An in situ sensor 22 (FIG. 1) can transfer the color patch readings of the marker to adjust the setpoints for the DFE controller 16. Such calibrating adjustments can be facilitated by the iNIC 20 or communicated back through the network for a more centralized control, particularly where a plurality of network DPS's need especially common accuracy. More particularly, process control algorithms can be resident in the iNIC 20 for DPS operating adjustment like color calibration. Tone reproduction curves and look-up tables in the DFE or DPS could then be continually calibrated for more consistent system accuracy. Content data also is intended to include commands, flags or instructions for the engine or interface controller to interpret or execute for determining under what conditions the system should return information to a remote entity. One of the things communicated from the remote entity to the system on the control stream is the information necessary to tell the system what events it should monitor for. When those occur it should report to the remote entity to communicate whatever the desired information is (i.e., that the event occurred and any other information diagnostics, billing or . . . ) back to the remote entity.

Software Update

Updating the software within the DPS will improve functionality and enable additional features. Update of code and algorithms at the component level is possible using a suitably defined and implemented interface that bypasses the DFE and talks directly to the DPS. Prior art technician/service software installation is reduced or eliminated by the direct upgrading from the network 18.

Consumables Supplies Status and Ordering

The status of supplies (e.g. toner, paper, colorants) in the marking system may be implemented in the SNMP-MIB provided by the DFE but that would require that the DFE make frequent requests of the marker to receive the information about supplies levels—an additional load to the DFE. Also, legacy markers maintain their data in their NVM (Non-Volatile Memory) rather than in a standardized interface. Access to this NVM is a model specific function because the NVM maps are different for each machine model number. In this case, the iNIC could perform additional functions such as reading the NVM maps and using that to populate the SNMP-MIB more fully and completely.

Variable Data Job Integrity

Details of the state of the finishing steps of a job may be tracked using glyph technologies sensed by a device that resides in the finishing station of the marking system. These readings need to be communicated to a networked computational entity that keeps track of the state of jobs as they flow through the document manufacturing floor. For example, are the proper documents being associated with the proper addresses or job originators? Again, sensor 22 would identify job output characteristics through glyphs or character readers to verify job integrity and this information can be communicated through the iNIC 20 to some other controller (not shown) that would certify the job.

Job Scheduling

Typically customers have a variety of document processing devices available on their networks. The choice of the appropriate device for processing a customer job depends both on the configuration of the device and its capability at the moment of job submission. For example, if the customer has a requirement for presentation quality transparencies, a device that is operating well and that has transparency media loaded is the best candidate. The nature of this near-real-time information requires the data-rich communication environment that the iNIC provides. Details on the configuration and current operating condition of the Document Processing System of which the iNIC is a connected part are required to make customer job routing decisions automatically.

Commercial and Operational Data

The expeditious identification and communication of commercial and operational data regarding DPS operation are particularly desirous for better business efficiency. Regular operating reports regularly communicated or in response to an inquiry received or engine event are useful communications. Billing information defining the chargeable use of a DPS by a customer can be virtually immediately identified, verified, and communicated to a DPS vendor. The iNIC 20 will receive the data from the marking engine 12 or sensor 22 (e.g. identity and number the copies or prints, toners or colorants used, time of DPS operation for either job execution or document composition, etc.) and transmit that data back to the vendor through the network 18. Accounting information comprising DPS usage identified per client or project may also be important to the customer. For example, a customer may frequently wish to identify copies or prints made for a particular client and the immediate identification and communication of this data is facilitated by the subject invention by its communication through the iNIC 20.

The invention has been described with reference to preferred embodiments, obviously alterations and modifications will occur to those of ordinary skill in the art. It is our intention to include all such equivalents within the scope of the invention.

Having now described the invention, we now claim:

1. A business to business communication system for controlling and monitoring a document processing device through network communications, comprising:

a document processing device responsive to remote communication signals and capable of issuing device operating status signals, the communication signals and status signals being received and sent, respectively, via a network system;

a network interface controller interposed between the document processing device and the network system for distinguishing the remote communication signals as job data or control data wherein the control data comprises object-oriented renderina data; and a document processing device controller, disposed intermediate the network interface controller and the document processing device, for translating the job data, which is communicated from the network interface controller to the document processing device independently from the control data, into a data format executable by the document processing device;

while the control data is communicated to the document processing device directly straight from the network interface controller and independently from the job data and wherein the object-oriented rendering data distinguishes text, pictures and business graphics for enhancing document processing device operation.

2. The system as defined in claim 1 wherein the object-oriented rendering data comprises page description language data about a document to be made at the document processing device.

\* \* \* \* \*